US009959602B2

(12) United States Patent
Kobayashi

(10) Patent No.: US 9,959,602 B2
(45) Date of Patent: May 1, 2018

(54) IMAGE PROCESSING DEVICE, RADIOGRAPHY APPARATUS, IMAGE PROCESSING METHOD, AND NON-TRANSITORY STORAGE MEDIUM

(71) Applicant: CANON KABUSHIKI KAISHA, Tokyo (JP)

(72) Inventor: Tsuyoshi Kobayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 66 days.

(21) Appl. No.: 14/206,495

(22) Filed: Mar. 12, 2014

(65) Prior Publication Data

US 2014/0270428 A1    Sep. 18, 2014

(30) Foreign Application Priority Data

Mar. 15, 2013 (JP) .................................. 2013-053598

(51) Int. Cl.
*G06T 5/00* (2006.01)
(52) U.S. Cl.
CPC .... *G06T 5/005* (2013.01); *G06T 2207/10116* (2013.01); *G06T 2207/30061* (2013.01)
(58) Field of Classification Search
CPC . G06T 2207/10116; G06T 2207/20076; G06T 5/002; G06K 9/346
See application file for complete search history.

(56) References Cited

U.S. PATENT DOCUMENTS

| | | | | |
|---|---|---|---|---|
| 6,055,295 A * | 4/2000 | Murthy | ..................... | A61B 6/06 378/145 |
| 6,333,990 B1 * | 12/2001 | Yazici | ....................... | G06T 5/10 382/132 |
| 8,189,946 B2 * | 5/2012 | Ohira | ..................... | H04N 19/61 348/607 |
| 2003/0043967 A1 * | 3/2003 | Aufrichtig | ........... | A61B 6/5258 378/207 |
| 2009/0080756 A1 * | 3/2009 | Chang et al. | ................. | 382/132 |

(Continued)

FOREIGN PATENT DOCUMENTS

| | | |
|---|---|---|
| JP | H02-096883 A | 4/1990 |
| JP | 2001-061823 A | 3/2001 |

(Continued)

OTHER PUBLICATIONS

Hiroshi Harashima, Kaoru Odajima, Yoshiaki Shishikui, Hiroshi Miyakawa, ε-Separating Nonlinear Digital Filter and Its Applications, The Journal of the Institute of Electronics, Information and Communication Engineers A, Apr. 25, 1982, 65A(4):297-304, IEICE, Tokyo JP, 1982.

*Primary Examiner* — Bhavesh Mehta
*Assistant Examiner* — Menatoallah Youssef
(74) *Attorney, Agent, or Firm* — Canon U.S.A., Inc. IP Division

(57) ABSTRACT

An image processing device and a radiography apparatus each include a pixel selection unit configured to select pixels of an image based on pixel values of pixels of the image obtained by capturing an image of a subject, and a subtraction processing unit configured to subtract, from the image, a line artifact extracted using a profile in predetermined direction and is based on the pixels selected by the pixel selection unit.

9 Claims, 10 Drawing Sheets

(56) References Cited

U.S. PATENT DOCUMENTS

| | | | | |
|---|---|---|---|---|
| 2009/0279663 A1* | 11/2009 | Miyamoto | ............... | A61B 6/00 378/62 |
| 2011/0019933 A1* | 1/2011 | Noda | ....................... | G06K 9/40 382/260 |
| 2011/0075910 A1* | 3/2011 | Kanagawa | ............. | A61B 6/025 382/131 |
| 2013/0142441 A1* | 6/2013 | Goto | ......................... | G06T 5/20 382/218 |
| 2013/0156337 A1* | 6/2013 | Kwon et al. | .................. | 382/264 |

FOREIGN PATENT DOCUMENTS

| JP | 2005-211488 A | 8/2005 |
|---|---|---|
| JP | 2010-22420 A | 2/2010 |
| JP | 2011-028588 A | 2/2011 |
| JP | 2012-095831 A | 5/2012 |

\* cited by examiner

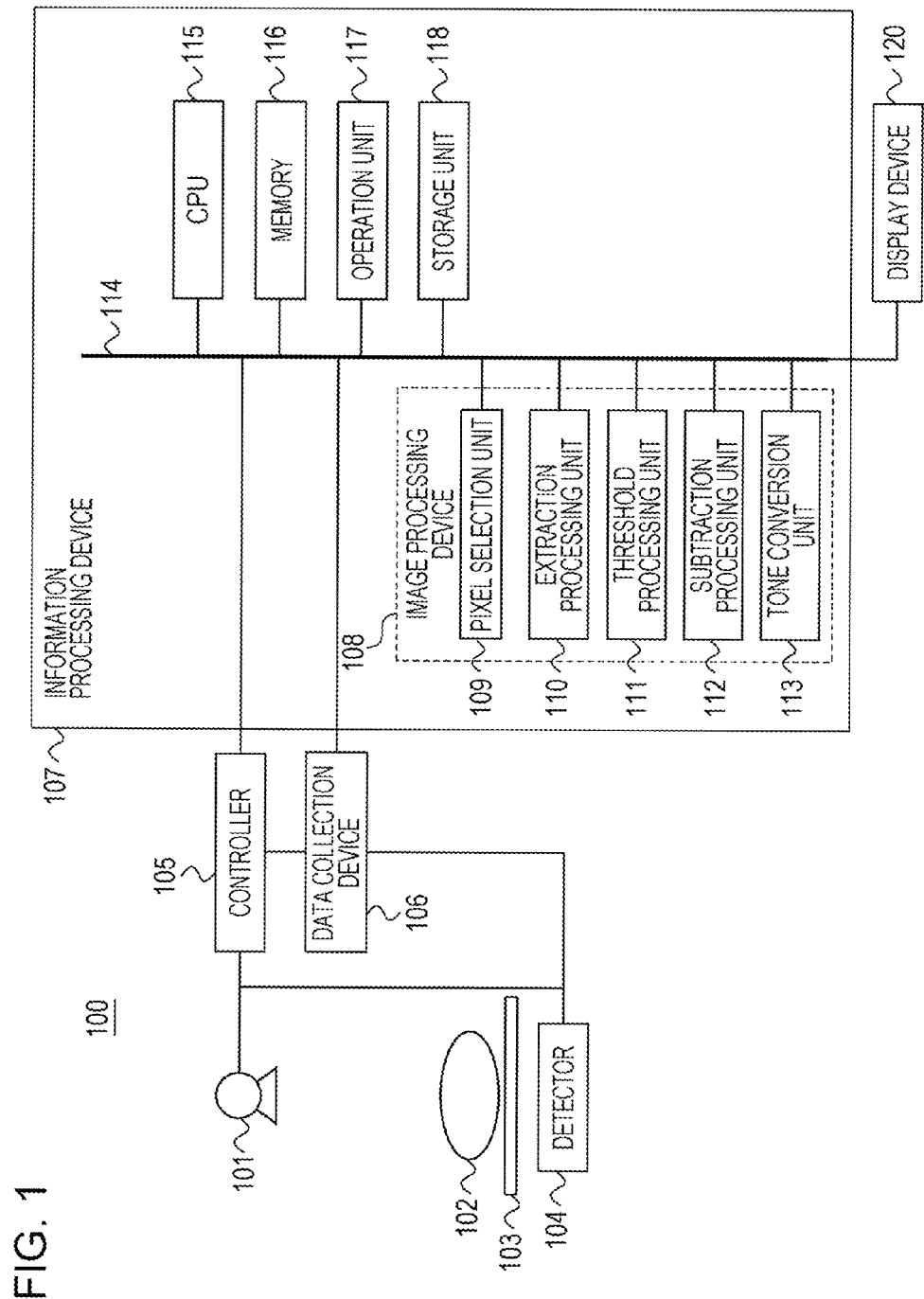

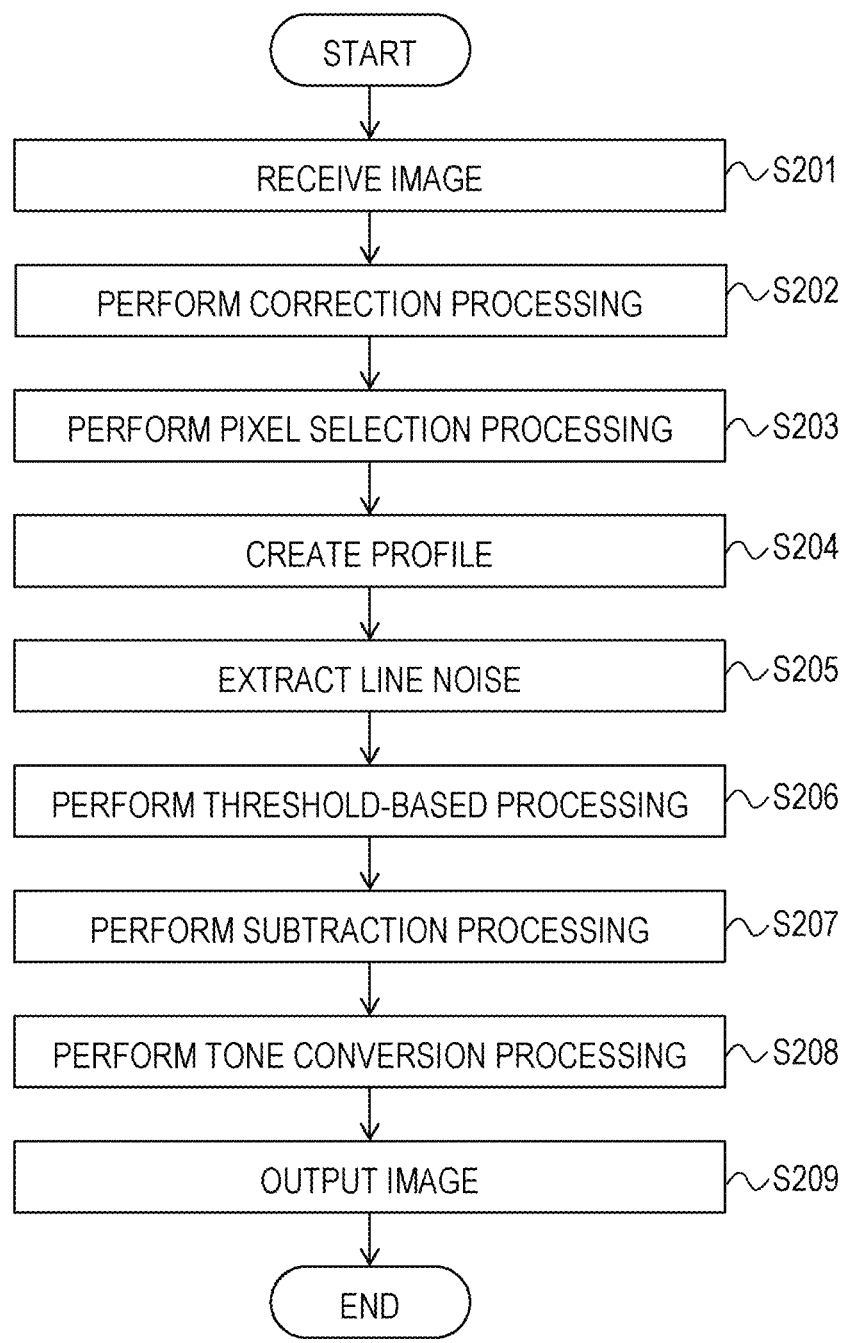

IMAGE PROCESSING DEVICE, RADIOGRAPHY APPARATUS, IMAGE PROCESSING METHOD, AND NON-TRANSITORY STORAGE MEDIUM

BACKGROUND

Field of Art

The present disclosure relates generally to an image processing device, a radiography apparatus, an image processing method, and a non-transitory storage medium, and particularly to a processing technique for reducing a line artifact included in an image.

Description of the Related Art

Currently, diagnosis and treatment based on images captured using radiation such as X-rays are widely carried out. Traditionally, analog radiography apparatuses which employ films have long been used. In recent years, however, digital radiography apparatuses have come into widespread use. Digital radiography apparatuses use detectors called flat panel detectors (FPDs) in which many semiconductor elements each configured to convert radiation into an electric signal are arranged in a two-dimensional matrix. Image data obtained with an FPD is transferred to a computer and is subjected to various kinds of image processing. An image based on the image data is then displayed on a display. In this way, digital radiography apparatuses allow diagnosis to be performed.

When image processing is performed using an FPD, a line artifact (vertical or horizontal streak-like unevenness) which has a specific pattern along a certain direction of an image may appear. Because such a line artifact often has low-frequency signal components, the line artifact sometimes degrades information regarding a subject or quality of an image of a subject. As a result, the image possibly becomes an unsuitable image to be used to determine whether or not the image is a satisfactory image.

To cope with this issue, the following processing is performed. A profile indicating an amount of noise included in a non-detection area shielded from radiation is generated. Then, a line artifact is removed from an image on the basis of the amount of noise of each line indicated by the generated profile (for example, Japanese Patent Laid-Open No. 2010-22420).

However, without an appropriately obtained non-detection area shielded from radiation, profile data indicating an amount of noise in the non-detection area is not to be generated. This consequently makes it challenging to appropriately remove a line artifact from an image.

SUMMARY

The present disclosure has been made in view of the aforementioned drawback and aspects of the present disclosure provide an image processing device, a radiography apparatus, an image processing method, and a non-transitory storage medium for appropriately removing a line artifact from an image regardless of whether or not a non-detection area shielded from radiation is obtained.

To this end, an image processing device, a radiography apparatus, an image processing method, and a non-transitory storage medium according to aspects of the present invention implement: selecting pixels of an image based on pixel values of pixels of the image obtained by capturing an image of a subject; and removing, from the image, a line artifact extracted using a profile in a predetermined direction based on the selected pixels.

Further features of the present invention will become apparent from the following description of exemplary embodiments with reference to the attached drawings.

BRIEF DESCRIPTION OF THE DRAWINGS

FIG. 1 is a block diagram illustrating an image processing device and a radiography apparatus according to a first embodiment of the present invention.

FIG. 2 is a flowchart illustrating an operation related to image processing according to the first embodiment of the present invention.

DESCRIPTION OF THE EMBODIMENTS

Figure 3A:
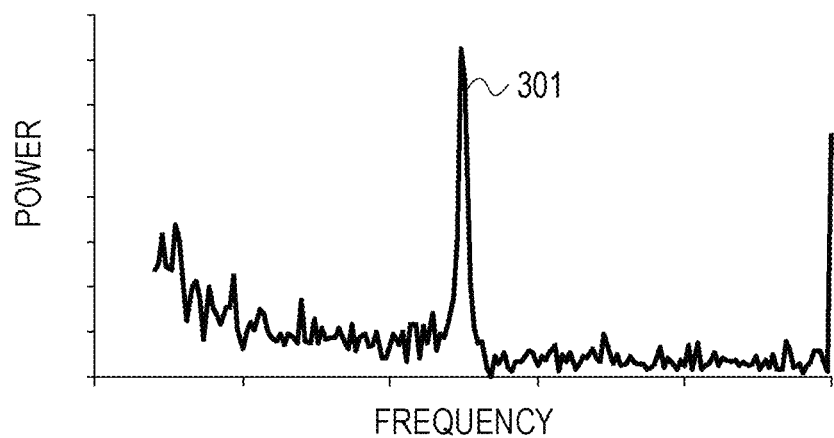
FIGS. 3A and 3B are diagrams illustrating an example of frequency responses of a line artifact and of a filter employed in the first embodiment of the present invention.

Embodiments of the present invention will be described below with reference to the accompanying drawings.

First Embodiment

Referring to FIG. 1, the configuration of an image processing device 108 and a radiography apparatus 100 according to a first embodiment will be described. FIG. 1 is a block diagram illustrating the basic configuration of the image processing device 108 and the radiography apparatus 100 according to the first embodiment of the present invention. The first embodiment describes a configuration in which the radiography apparatus 100 includes the image processing device 108.

The radiography apparatus 100 includes a radiation generator 101, a table 103, a detector 104, a controller 105, a data collection device 106, an information processing device 107, and a display device 120. The radiation generator 101 is configured to generate radiation. On the table 103, a subject 102 lies down. The detector 104 is configured to detect radiation that has passed through the subject 102 and to output image data based on the detected radiation. The controller 105 is configured to control a timing at which the radiation generator 101 generates radiation and radiograph capturing conditions. The data collection device 106 is configured to collect various pieces of data. The information processing device 107 is configured to control, in accordance with an instruction from a user, image processing or the entire apparatus. The display device 120 is configured to display an image output from the information processing device 107.

The information processing device 107 includes a central processing unit (CPU) 115, a memory 116, an operation unit 117, a storage unit 118, and the image processing device 108. The CPU 115 is configured to control each component of the information processing device 107. The memory 116 is configured to temporarily store various pieces of data. The operation unit 117 is used by a user to enter an instruction. The storage unit 118 is configured to store various pieces of data. The image processing device 108 is configured to perform image processing on an image. The CPU 115, the memory 116, the operation unit 117, the storage unit 118, and the image processing device 108 are electrically connected to one another via a CPU bus 114. The memory 116 stores various pieces of data used during processing performed by the CPU 115 and includes a work memory for the CPU 115. The CPU 115, for example, controls operations of the image processing device 108 and the radiography apparatus 100 using the memory 116, in accordance with an instruction entered to the operation unit 117 from a user.

In response to an instruction entered to the operation unit 117 from a user, X-rays are radiated and an image is captured. Specifically, the subject 102 is irradiated with radiation generated by the radiation generator 101 under predetermined capturing conditions. The detector 104 is irradiated with radiation that has passed through the subject 102. The controller 105 controls capturing conditions, such as voltage, current, and an irradiation period, set in the radiation generator 101. The radiation generator 101 is configured to generate radiation in accordance with predetermined capturing conditions. Information of radiation detected by the detector 104 is converted into electric signals. The electric signals are then collected as an image by the data collection device 106.

The image processing device 108 is supplied with the image obtained by the data collection device 106 and performs processing for removing a line artifact from the image. Specifically, the image processing device 108 selects pixels of an image based on pixel values of pixels of the image obtained by capturing an image of the subject 102, and subtracts, from the image, a line artifact extracted using a profile in a predetermined direction based on the selected pixels.

The image processing device 108 includes at least a pixel selection unit 109 and a subtraction processing unit 112. The pixel selection unit 109 is configured to select pixels of an image based on pixel values of pixels of the image obtained by capturing an image of the subject 102. The subtraction processing unit 112 is configured to subtract, from the image, a line artifact extracted using a profile in a predetermined direction based on the pixels selected by the pixel selection unit 109.

The image processing device 108 also includes an extraction processing unit 110, a threshold processing unit 111, and a tone conversion unit 113. The extraction processing unit 110 is configured to extract line artifact components using the profile in the predetermined direction based on the pixels selected by the pixel selection unit 109. The threshold processing unit 111 is configured to perform predetermined threshold-based processing on the extracted line artifact components. The tone conversion unit 113 is configured to perform tone conversion on the line-artifact-removed image obtained by the subtraction processing unit 112.

Referring now to FIG. 2, an example of an operation performed by the image processing device 108 will be described. FIG. 2 is a flowchart illustrating an operation performed by the image processing device 108.

In step S201, the image processing device 108 receives an image from the data collection device 106 via the CPU bus 114.

In step S202, the image processing device 108 performs correction processing on the image if needed. The image processing device 108 performs correction for defective pixels while suppressing moiré by deriving a weighted average of the image in the diagonal direction using, for example, an available technique disclosed in Japanese Patent Laid-Open No. 2005-211488. As a result, a moiré-suppressed image in which pixel values of the defective pixels have been corrected is created. Note that step S202 may be omitted.

In step S203, the pixel selection unit 109 performs pixel selection processing for selecting pixels from the image resulting from the correction processing. A detailed operation of the pixel selection unit 109 will be described later. As a result of the pixel selection processing, specific pixels are selected from individual lines and a selected pixel set Sel is created.

In step S204, the extraction processing unit 110 first determines a linear combination of the pixels selected in step S203 so as to create a one-dimensional profile orthogonal to the individual lines. That is, the extraction processing unit 110 creates a one-dimensional profile orthogonal to a reading direction of the detector 104. Let n(x) denote the number of elements included in an x-th line of the selected pixel set Sel(x, i) and let w denote a width of the image resulting from the correction processing. In this case, a profile prof(x) is created by deriving averages of respective lines as indicated by Equation 1 below, for example.

$$prof(x) = \begin{cases} 0, & n(x) = 0 \\ \dfrac{\sum_{i=1}^{n(x)} Sel(x, i)}{n(x)}, & n(x) \neq 0, \ x = (1, 2, \ldots, w) \end{cases} \quad \text{(Equation 1)}$$

In step S205, the extraction processing unit 110 extracts line artifact components using the profile created in step S204. For example, in the case where an absolute value of a difference in pixel value between a given line of an image and its adjacent line of the image is large, the extraction processing unit 110 extracts line artifact components by performing processing using an edge-preserving high-pass filter. Herein, an edge-preserving high-pass filter using a Gaussian filter as its basic filter will be described by way of example. Let Art(x) denote a line artifact component at a coordinate x, prof(x) denote a profile component at the coordinate x, and σ and r respectively denote the radius and order of the Gaussian filter that decide frequency characteristics of the filter. In this case, the edge-preserving high-pass filter is implemented as indicated by Equation 2. With Equation 2, in the case where the absolute value of the difference in pixel value between a pixel of interest and its adjacent pixel is larger than ϵ, a filter coefficient for the adjacent pixel is set to be 0. Thus, even the extracted profile includes components originating from a subject, line artifact components may be extracted while removing the influence of the components originating from the subject.

$$Art(x) = prof(x) - \quad \text{(Equation 2)}$$

-continued $$\sum_{i=-r}^{r} \frac{\exp\left(-\frac{i^2}{2\sigma^2}\right) \times F(prof(x) - prof(x+i))}{\sum_{j=-r}^{r} \exp\left(-\frac{j^2}{2\sigma^2}\right) \times F(prof(x) - prof(x+j))} \times prof(x+i)$$

$$\begin{cases} F(p) = 1 & \text{for } |p| < \varepsilon \\ F(p) = 0 & \text{for } |p| \geq \varepsilon \end{cases}, x = (1, 2, \ldots, w)$$

Figure 3B:
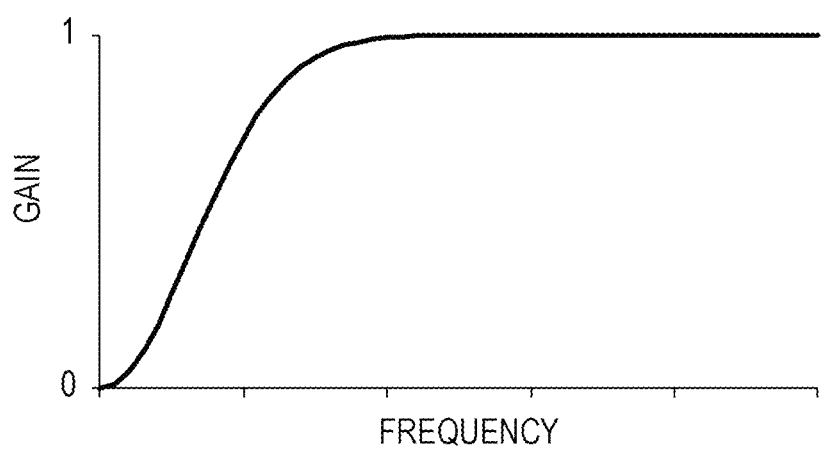

Parameters of the filter are decided in accordance with a frequency response of a line artifact so that an appropriate area is to be extracted. For example, as illustrated in FIG. 3A, the extraction processing unit 110 determines frequency characteristics of a line artifact using the profile created in step S204 and detects a peak originating from line artifact components. FIG. 3A illustrates a peak 301. The filter is designed so as to pass the peak originating from the line artifact components as illustrated in FIG. 3B. Because the Gaussian filter is used in this example, FIG. 3B illustrates an example of a simple high-pass filter; however, a band-pass filter may be used as the basic filter depending on the frequency characteristics of the line artifact.

Equation 2 is described as an example of the edge-preserving high-pass filter; however, the edge-preserving processing is not limited to the one using the above-described filter. Any available edge-preserving high-pass filter, such as an ε filter described in "Harashima and three others, 'ε-nonlinear digital filter and its applications (ε-Hisenkei Digital Filter to Sono Oyo)', The Journal of the Institute of Electronics, Information and Communication Engineers A, Vol. J65-A, No. 4, pp. 297-304, April, 1982", may be used.

In step S206, the threshold processing unit 111 performs threshold-based processing on the line artifact components extracted in step S205. The threshold-based processing is correction processing performed in case where a line artifact is not appropriately extracted because of insufficient removal of the influence of the subject during creation of the profile. The threshold processing unit 111 obtains, based on hardware characteristics of the detector 104 and specs of produced components of the detector 104, a possible largest value of a line artifact that possibly occurs in an image as a threshold Th in advance. If a value of the extracted line artifact is larger than or equal to the threshold Th, the threshold processing unit 111 removes this value. The value removed by the threshold processing unit 111 is replaced with a new value obtained through correction based on adjacent pixels. In this way, even when a line artifact is erroneously extracted, the threshold-based processing reduces the risk of destroying an output image. Note that step S206 may be omitted.

In step S207, the subtraction processing unit 112 subtracts the line artifact components created through the processing up to step S206 from the image. A line artifact shows a strong correlation in a predetermined direction, for example, the vertical direction. Accordingly, the subtraction processing unit 112 expands the line artifact components into a two-dimensional plane so as to remove a line artifact from the image.

In step S208, the tone conversion unit 113 performs tone conversion on the line-artifact-removed image. Any available tone conversion processing may be used for this tone conversion. If a preview image used to determine whether the image is a satisfactory image is desired, high-speed processing is desired. Accordingly, the tone conversion unit 113 performs simple color density correction based on logarithmic transformation and normalization. This configuration allows the tone conversion unit 113 to output a tone-converted image at a high speed.

In step S209, the corrected line-artifact-removed image is output to the storage unit 118 or the display device 120. The storage unit 118 stores the image corrected by the image processing device 108. The display device 120 displays the image corrected by the image processing device 108.

Figure 4:
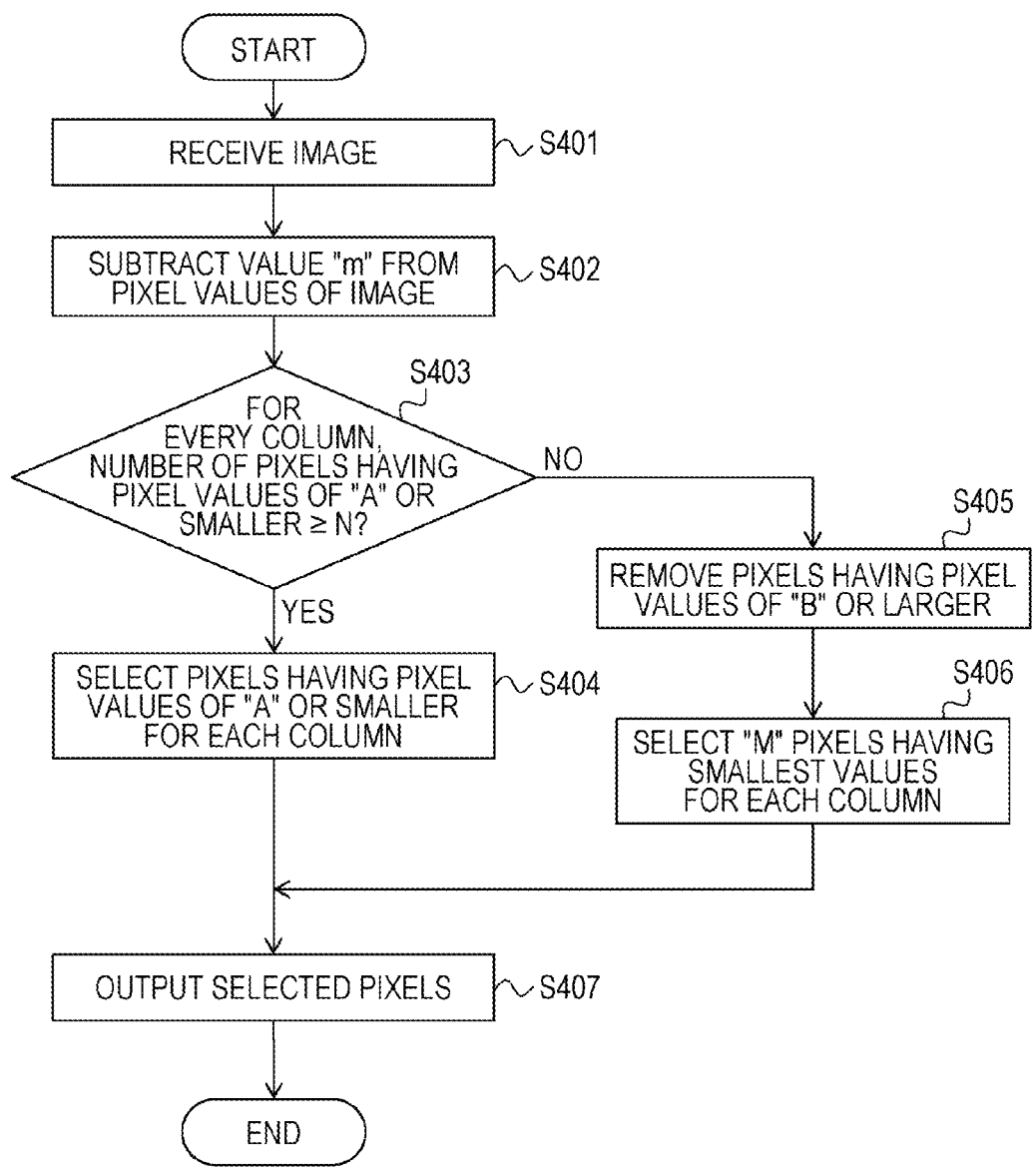
FIG. 4 is a flowchart illustrating an operation of a pixel selection unit in the first embodiment of the present invention.

Referring next to FIG. 4, an example of the operation performed by the pixel selection unit 109 will be described in detail. FIG. 4 is a flowchart illustrating the operation performed by the pixel selection unit 109 (in step S203). Here, the case where a line artifact has occurred along the vertical direction of an image will be described. A line artifact originates from fixed pattern noise. The smaller an amount of X-rays that reach the detector 104, the larger a proportion of a line artifact in a signal. In order to appropriately extract a line artifact in steps S204 and S205, it is desirable that the pixel selection unit 109 select pixels corresponding to signals which have a high proportion of the line artifact and create a profile.

First, in step S401, the image processing device 108 receives an image collected by the data collection device 106.

In step S402, the image processing device 108 subtracts a predetermined value "m" from pixel values of individual pixels of the image input to the image processing device 108. Fixed pattern noise of the detector 104, which is supposed to be removed, is not sufficiently removed from the image input to the image processing device 108. As a result, pixel values in an area not irradiated with X-rays are not zero. The influence of the remaining fixed pattern noise disturbs a proportional relationship between the amount of radiated X-rays and the output pixel value. This consequently makes it difficult to perform radiation-dose-based processing. The processing of this step is an operation for addressing this problematic situation in a simplified way and making it easier to perform the following processing. As the predetermined value "m", the smallest value among pixel values of the input image may be used, for example. The smallest value is subtracted from each of the pixel values of the image input to the image processing device 108.

In step S403, the pixel selection unit 109 determines, for each line along a predetermined direction of the image, whether the line includes N pixels or more each having a pixel value smaller than or equal to a predetermined value A. This processing identifies the case where part of the detector 104 is shielded by a collimator and is also effective as simple radiation-dose-based processing that enables the preferential use of the shielded part.

Because an area shielded by a collimator has less image information regarding the subject 102, a line artifact is appropriately extracted therefrom. For this reason, if every line includes an area shielded by a collimator, a line artifact is desirably extracted from these shielded areas.

The pixel value A is decided in accordance with the static based on characteristics of the detector 104. For example, a value obtained by integrating the X-ray sensitivity of the detector 104 and a typical amount of radiation including scattered radiation incident to the collimator region is preferably used as the pixel value A.

The number of pixels N is decided in accordance with the amount of noise added by the detector 104 or the size of the collimator region. For example, based on the amount of noise included in a line artifact, the lower limit of the number of pixels N is decided to be a sufficient number of pixels to extract the line artifact. Alternatively, based on the size of a region that is possibly used as the collimator region, the upper limit of the number of pixels N is decided. Note that the user is permitted to set the pixel value A and the number of pixels N to given values using the operation unit 117.

If a result of the determination processing of this step indicates true, the pixel selection unit 109 determines that every line has an area shielded by a collimator and the process proceeds to step S404. If not, the pixel selection unit 109 determines that not all lines have an area shielded by a collimator and the process proceeds to step S405.

Figure 5:
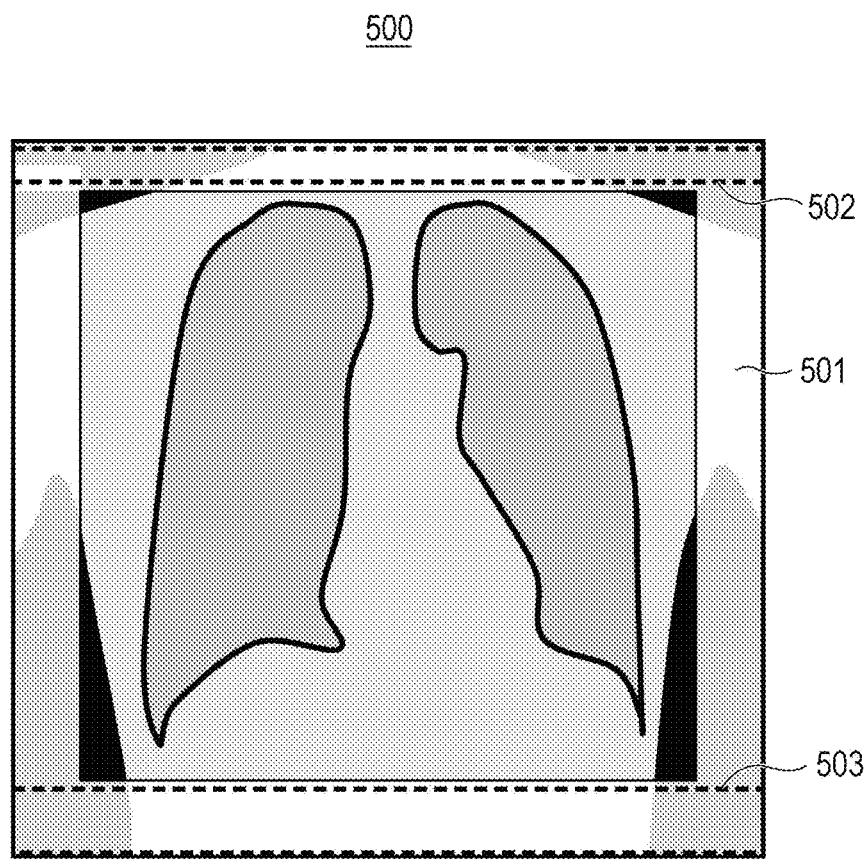
FIG. 5 is a diagram illustrating an example of an image displayed on a display device in the first embodiment of the present invention.
Figure 6:
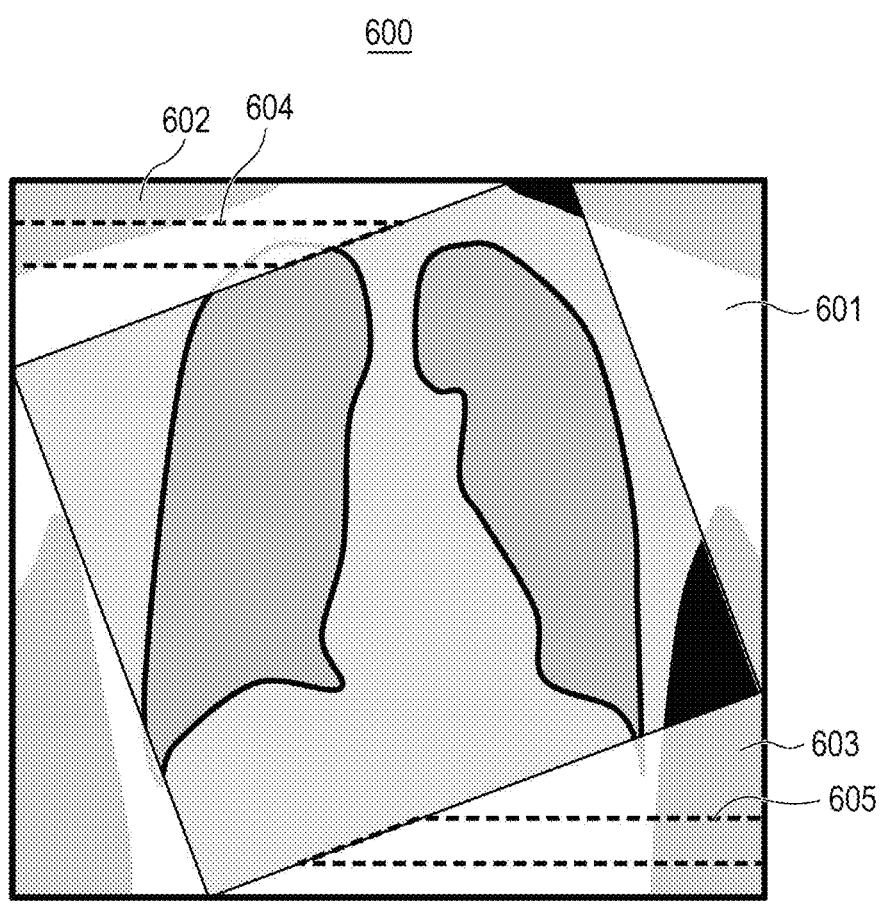
FIG. 6 is a diagram illustrating an example of an image displayed on the display device in the first embodiment of the present invention.
Figure 7:
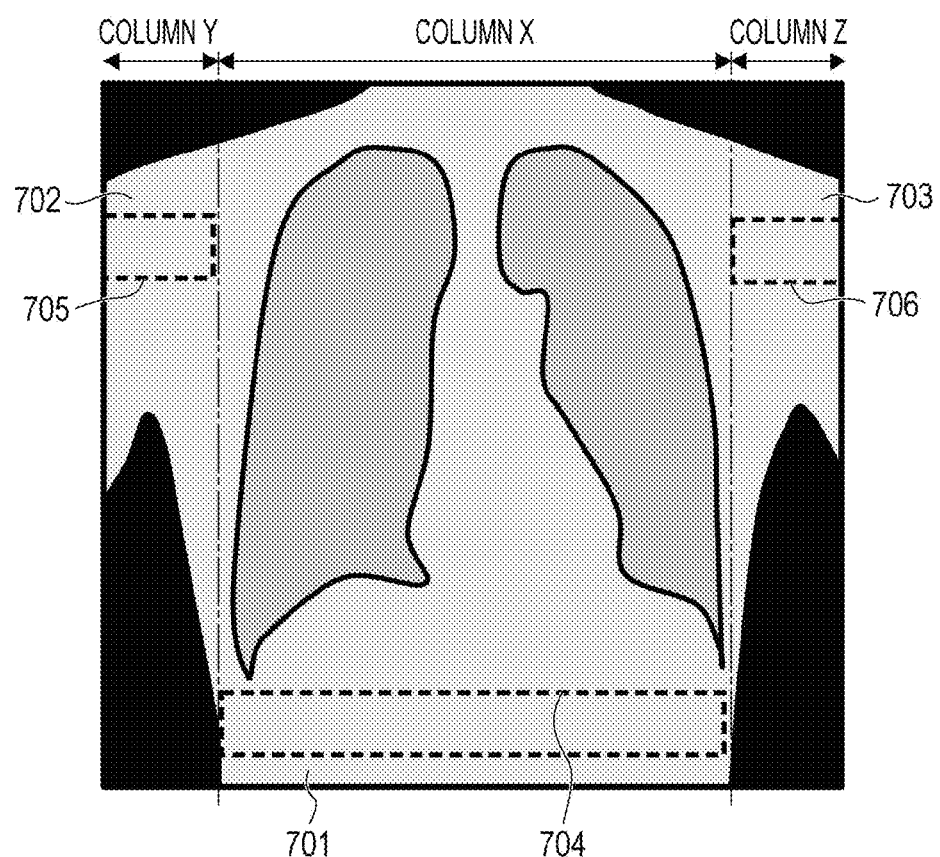
FIG. 7 is a diagram illustrating an example of an image displayed on the display device in the first embodiment of the present invention.

In step S404, the pixel selection unit 109 selects, for each line, N pixels selected in step S403. The process then proceeds to step S407. Referring to FIGS. 5 to 7, details about the operation performed in step S404 will be described below.

FIG. 5 illustrates a case where a collimator is located horizontally and the periphery of an image 500 is shielded by the collimator. In this case, an area 501 shielded by the collimator is an area in which pixel values are smaller than or equal to the pixel value A. From this area of the image 500 in which pixel values are smaller than or equal to the pixel value A, the pixel selection unit 109 selects a rectangular area, for example, an area 502. If the number of pixels included in any of lines (any of columns in this example) of the selected area 502 is less than N, the pixel selection unit 109 additionally selects a rectangular area 503 located at the lower part of the image 500. In this way, the pixel selection unit 109 ensures N pixels in every line by adding the number of pixels in the area 502 and the number of pixels in the area 503. If N pixels are selected in every line by the pixel selection unit 109, the process proceeds to step S407.

FIG. 6 illustrates a case where an area 601 shielded by the collimator is diagonally included in an image 600. An upper left area 602 and a lower right area 603 of the image 600 are areas in which pixel values are smaller than or equal to the pixel value A. The pixel selection unit 109 selects pixels in an area 604 included in the upper left area 602 of the image 600. In this case, the collimator shields radiation diagonally. Thus, pixels having pixel values smaller than or equal to the pixel value A are not to be selected in every line (every column in this example) only using the upper left area 602. Accordingly, pixels are also selected in an area 605 included in the lower right area 603. In this way, the pixel selection unit 109 ensures N pixels in every line by adding the numbers of pixels selected in both the areas 604 and 605. The area 604 is a trapezoid having an upper base longer than a lower base. The area 605 is a trapezoid having a lower base longer than an upper base. If N pixels are selected in every line by the pixel selection unit 109 in this way, the process proceeds to step S407.

As described above, in step S404, the pixel selection unit 109 is configured to select N pixels having pixel values smaller than or equal to the pixel value A in every line in an area obtained by connecting (adding) a plurality of sub-areas in a predetermined direction (column direction).

Steps S405 and S406 are processing performed when it is determined that there is no area shielded by a collimator. In this case, the pixel selection unit 109 selects pixels in an area in which a proportion of a line artifact is high.

In step S405, the pixel selection unit 109 removes, from the image, pixels having pixel values larger than or equal to a pixel value B. The pixel value B is a threshold at which it is determined that extraction of a line artifact becomes highly likely to be unsuccessful because of a large amount of subject information, and is decided in accordance with the statistic based on characteristics of the detector 104. Specifically, the pixel value B is preferably determined using the possible largest value Th for a line artifact that possibly occurs in an image, the possible largest value Th being determined based on hardware characteristics of the detector 104 and specs of produced components of the detector 104, and a constant ratio C such that B=Th/C is satisfied. For example, a past subjective evaluation experiment result indicates that if a proportion of an artifact in a signal is equal to 1% or smaller, the artifact hardly influences a medical image. In this case, the ratio C is set to be C=0.01, and an area including signals for which a proportion of the largest value Th of a line artifact in the signal is smaller than or equal to 1% is determined as an area in which extraction of a line artifact fails and is excluded. Note that the ratio C changes to an appropriate value depending on noise characteristics of the detector 104. Thus, the ratio C is desirably changed appropriately by performing visual evaluation or the like in advance.

In step S406, the pixel selection unit 109 sorts, for each line, pixel values in ascending order and selects up to M pixels in the ascending order of pixel value. That is, the pixel selection unit 109 selects, for each line along a predetermined direction of an image, a predetermined number of pixels in ascending order of pixel value. The number of pixels M is set in accordance with an amount of noise added by the detector 104. Desirably, the number of pixels M is set empirically while examining the effect. Note that the user may set the number of pixels M to a given value using the operation unit 117.

FIG. 7 illustrates an image 700 not including an area shielded by a collimator. The pixel selection unit 109 sorts, for each line (every column in this example) of the image 700, in ascending order of pixel value, and selects up to M pixels in ascending order of pixel value. In this case, suppose that an abdominal portion 701 is an area including the smallest pixel values in a column X, a left shoulder portion 702 is an area including the smallest pixel values in a column Y, and a right shoulder portion 703 is an area including the smallest pixel value in a column Z.

The pixel selection unit 109 selects, for each line, up to M pixels in ascending order of pixel value. In the column X, an area 704 including small pixel values that have been sorted is selected from the abdominal portion 701. Similarly, in the column Y, an area 705 having small pixel values that have been sorted is selected from the left shoulder portion 702. In the column Z, an area 706 having the small pixel values that have been sorted is selected from the right shoulder portion 703. The areas 704, 705, and 706 selected by the pixel selection unit 109 have horizontal widths of the columns X, Y, and Z, respectively, and have vertical widths of up to M pixels. As described above, the pixel selection unit 109 is configured to sort, for each line of the image 700, pixel values in ascending order and to select up to M pixels in ascending order of pixel value.

In the case where pixel values in a given line are high and there is no pixel to be selected by the pixel selection unit 109, the number of elements for this line is set to be zero. In a line in which the number of elements is zero, all pixels have pixel values larger than or equal to the pixel value B. Thus, it is considered that, even if a line artifact has the possible largest value, the influence of the line artifact on the medical image is small. Accordingly, the pixel selection unit 109 does not select pixels having pixel values larger than or equal to the pixel value B and skips line artifact extraction processing. Note that the user is permitted to set the pixel value B to any given value using the operation unit 117.

Figure 8:
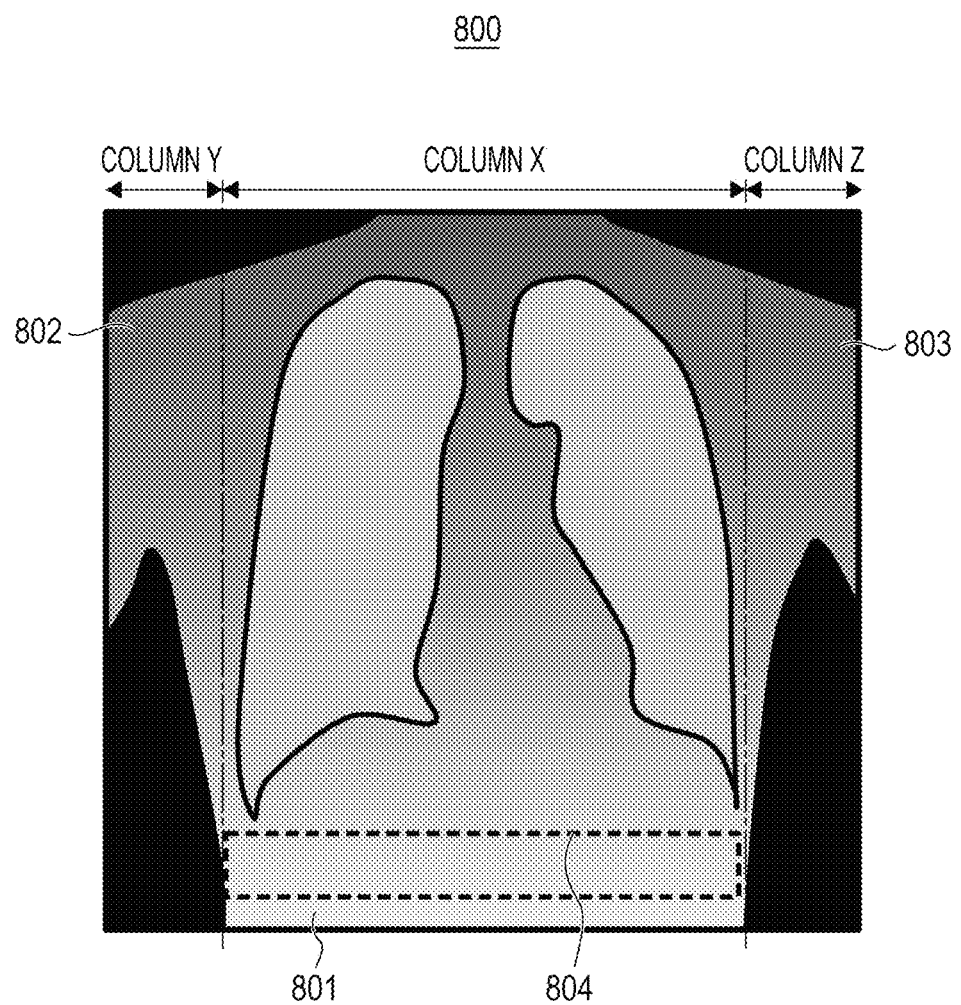
FIG. 8 is a diagram illustrating an example of an image displayed on the display device in the first embodiment of the present invention.

FIG. 8 illustrates an image 800 not including an area shielded by a collimator. In this case, suppose that an abdominal portion 801 has pixel values smaller than the pixel value B and a left shoulder portion 802 and a right shoulder portion 803 have pixel values larger than or equal to the pixel value B. The pixel selection unit 109 sorts, for each line (each column in this example) of the image 800, pixel values in ascending order, and selects up to M pixels in ascending order of pixel values. In the column X, an area 804 having small pixel values that have been sorted is selected from the abdominal portion 801. For the columns Y and Z, however, the line artifact extraction processing is skipped. Specifically, pixels included in the columns X and Z all have pixel values larger than or equal to the pixel value B. Thus, the pixel selection unit 109 does not select any pixels in the columns Y and Z, which are columns including pixels having pixel values larger than or equal to the pixel value B. In this way, the pixel selection unit 109 selects only the area 804 for the column X and performs the line artifact extraction processing for the column X.

In step S407, the pixels included in the area selected in step S404 or S406 in the above manner are output. Thereafter, step S203 of FIG. 2 ends and the process proceeds to step S204.

As described above, the image processing device 108 or the radiography apparatus 100 according to the first embodiment of the present invention includes the pixel selection unit 109 configured to select pixels of an image based on pixel values of pixels of the image obtained by capturing an image of the subject 102; the extraction processing unit 110 configured to extract a line artifact, using a profile in a predetermined direction based on the pixels selected by the pixel selection unit 109; and the subtraction processing unit 112 configured to subtract the extracted line artifact from the image. Also, an image processing method includes selecting pixels of an image based on pixel values of pixels of the image; extracting a line artifact, using a profile in a predetermined direction based on the selected pixels; and subtracting the extracted line artifact from the image.

Accordingly, a line artifact may be appropriately removed regardless of whether or not a non-detection area of a radiograph shielded from radiation is obtained. Also, an artifact-reduced image may be output even when a low-frequency line artifact occurs in a state where correction of fixed pattern noise of a detector is insufficient.

Second Embodiment

Figure 9:
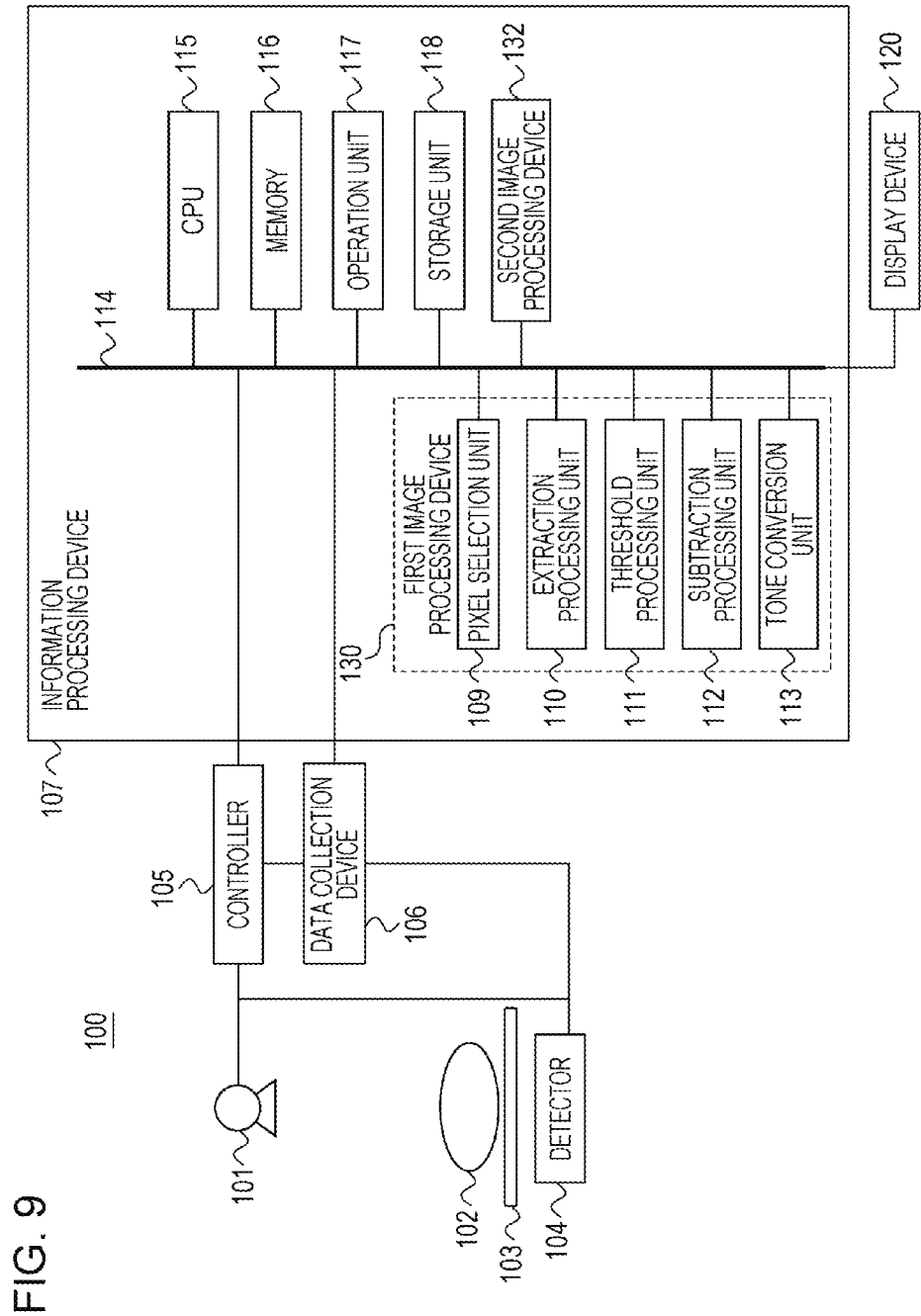
FIG. 9 is a block diagram illustrating image processing devices and a radiography apparatus according to a second embodiment of the present invention.
Figure 10:
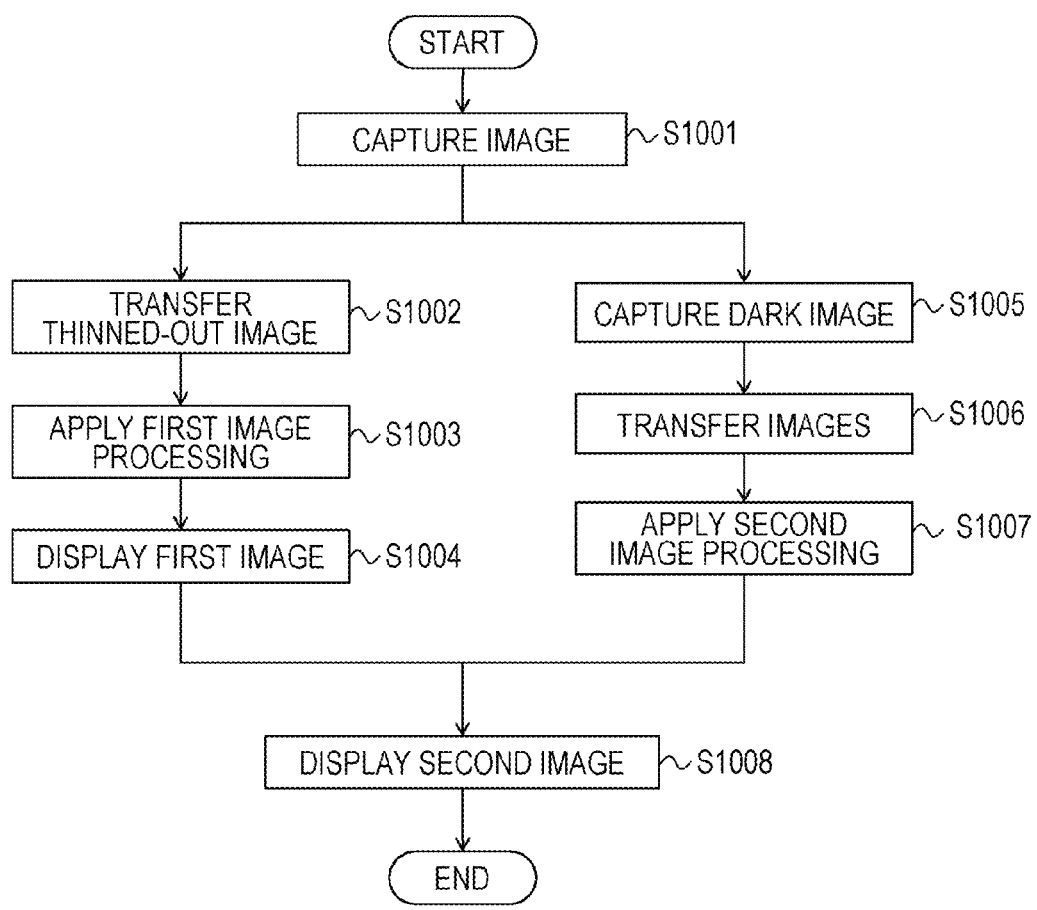
FIG. 10 is a flowchart illustrating an operation related to image processing according to the second embodiment of the present invention.

Referring now to FIGS. 9 and 10, a second embodiment will be described. Differences from the first embodiment are that image processing sections (a first image processing device 130 and a second image processing device 132) are configured to perform a plurality of kinds of image processing and to display the processed images on the display device 120.

The radiography apparatus 100 illustrated in FIG. 9 is equivalent to the radiography apparatus 100 illustrated in FIG. 1 additionally including the second image processing device 132. The first image processing device 130 corresponds to the image processing device 108, and thus a description thereof is omitted. The second image processing device 132 is configured to perform, on an image, image processing different from the image processing performed by the first image processing device 130. Details will be described later.

Referring to FIG. 10, an operation performed by the radiography apparatus 100 (mainly the first image processing device 130 and the second image processing device 132) according to the second embodiment will be described. FIG. 10 is a flowchart illustrating processing performed by the radiography apparatus 100.

In step S1001, the radiation generator 101 radiates radiation to the subject 102 under predetermined capturing conditions. The detector 104 detects radiation that has passed through the subject 102. The detector 104 converts the detected radiation into electrical signals. The data collection device 106 collects image data.

The operation performed by the radiography apparatus 100 after step S1001 branches into two kinds of processing, that is, processing of steps S1002 to S1004 performed mainly by the first image processing device 130 and steps S1005 to S1007 performed mainly by the second image processing device 132. The processing of steps S1002 to S1004 and the processing of steps S1005 to S1007 may be performed in parallel.

In step S1002, an image collected by the data collection device 106 is partially thinned out and is transferred to the information processing device 107. Any available technique for thinning out an image, for example, the one disclosed in Japanese Patent Laid-Open No. 2005-211488, may be used. For example, a ⅛ of pixel values are thinned out in the main scanning direction. In the case of image capturing using a grid in order to suppress scattered X-rays, moiré caused in an image due to interference between the grid density and the pixel pitch of the detector 104 may be addressed. The transferred thinned-out image is further transferred to the memory 116 via the CPU bus 114 under control of the CPU 115.

In step S1003, the first image processing device 130 applies first image processing to the image transferred to the memory 116. The first image processing is as described in relation to the image processing device 108 in the first embodiment.

In step S1004, a first image on which the first image processing has been applied is displayed on the display device 120 as a preview image. The display device 120 displays, for a predetermined period, the first image on which the first image processing has been applied.

While the processing of steps S1002 to S1004 is being performed, a dark image is captured in step S1005. A dark image is an image captured without irradiating X-rays for the same accumulation period immediately after an X-ray image is captured in step S1001.

By subtracting a dark image from an image, dark correction for cancelling fixed pattern noise of an FPD may be performed. The thinned-out image is transferred in step S1002 before the dark image is captured in step S1005. Thus, the thinned-out image may be displayed with a period for capturing a dark image being reduced.

In step S1006, the image and the dark image are transferred. The transferred image and dark image are further transferred to the memory 116 via the CPU bus 114 under control of the CPU 115.

In step S1007, the second image processing device 132 applies second image processing to the image and dark image transferred to the memory 116. The second image processing includes preprocessing such as dark correction and gain correction, noise reduction processing, various kinds of enhancement processing, and tone conversion processing. During the processing of steps S1005 and S1006, the images may be transferred in a divided manner or the full-size images that have not been thinned out may be transferred. Alternatively, the two images may be separately transferred in step S1006. The second image processing related to dark correction for subtracting a dark image from an image may be performed by the data collection device 106 and data of the one image may be transferred to the information processing device 107 so as to reduce an amount of transferred data.

In step S1008, the display device 120 displays a second image on which the second image processing different from the first image processing has been applied. The display device 120 hides the first image on which the first image processing has been applied when displaying the second image on which the second image processing has been applied.

According to the second embodiment, the user is permitted to check the first image on which the first image processing has been applied to determine whether the image is a satisfactory image and to re-capture an image rapidly if the first image is problematic. If the first image on which the first image processing has been applied is not problematic, the user is permitted to check the second image which is displayed later and on which the second image processing has been applied to make diagnosis.

Note that the term "radiation" encompasses not only X-rays which are generally used but also a beam constituted by particles (including photons) emitted as a result of radioactive decay, e.g., alpha radiation, beta radiation, or gamma radiation; and a beam having equivalent energy or more, e.g., corpuscular rays or cosmic rays.

Third Embodiment

A computer program implementing the functions of the first or second embodiment may be supplied to a computer via a network or a storage medium (not illustrated) and may be executed. That is, the computer program is a program for causing a computer to implement functions of the image processing device. The storage medium stores the computer program.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-053598, filed Mar. 15, 2013, which is hereby incorporated by reference herein in its entirety.

What is claimed is:

1. An image processing device comprising:
a pixel selection unit configured to select a plurality of pixels having pixel values being equal to or smaller than a first predetermined pixel value for each line in an area shielded by a collimator in a case where an image includes the area shielded by the collimator;
an extraction processing unit configured to extract a line artifact in the area in which the pixels are selected by the pixel selection unit; and
a subtraction processing unit configured to subtract the extracted line artifact from the image, wherein in a case where the image does not include the area shielded by the collimator, the pixel selection unit removes, from the image, pixels having pixel values larger than or equal to a second predetermined pixel value and selects a plurality of pixels in ascending order of pixel value for each line of the image after removing the pixels.

2. The image processing device according to claim 1, wherein the pixel selection unit is configured to select pixels corresponding to signals each having a high proportion of the line artifact.

3. The image processing device according to claim 1, wherein the pixel selection unit is configured to determine, for each line along a predetermined direction of the image, whether the line includes the plurality of pixels or more each having a pixel value equal to or smaller than the first predetermined pixel value.

4. The image processing device according to claim 1, wherein the pixel selection unit is configured to select, for each line along a predetermined direction of the image, the predetermined number of pixels in ascending order of pixel value.

5. The image processing device according to claim 1, further comprising
a threshold processing unit configured to perform predetermined threshold-based processing on the extracted line artifact.

6. The image processing device according to claim 1, further comprising
a tone conversion unit configured to perform tone conversion on an image obtained by subtracting the line artifact using the subtraction processing unit.

7. A radiography apparatus comprising:
a radiation generator configured to generate radiation;
a detector configured to detect radiation that has passed through a subject; and
the image processing device according to claim 1.

8. An image processing method comprising:
selecting a plurality of pixels having pixel values being equal to or smaller than a first predetermined pixel value for each line in an area shielded by a collimator in a case where an image includes the area shielded by the collimator;
extracting a line artifact in the area in which the pixels are selected; and
subtracting the extracted line artifact from the image, wherein in a case where the image does not include the area shielded by the collimator, selecting comprises removing, from the image, pixels having pixel values larger than or equal to a second predetermined pixel value and selecting the plurality of pixels in ascending order of pixel value for each lie of the image after removing the pixels.

9. A non-transitory storage medium storing a computer program causing a computer to execute the image processing method according to claim 8.

* * * * *